Sept. 20, 1938.  F. C. FRANK  2,130,881
WHEEL
Filed April 24, 1935   3 Sheets-Sheet 1

INVENTOR.
FREDERICK C. FRANK
BY A. E. Wilson
ATTORNEY

Sept. 20, 1938.  F. C. FRANK  2,130,881
WHEEL
Filed April 24, 1935   3 Sheets-Sheet 2

INVENTOR.
FREDERICK C. FRANK
BY A. E. Wilson
ATTORNEY

Sept. 20, 1938.   F. C. FRANK   2,130,881
WHEEL
Filed April 24, 1935   3 Sheets-Sheet 3

INVENTOR.
FREDERICK C. FRANK
BY
ATTORNEY

Patented Sept. 20, 1938

2,130,881

UNITED STATES PATENT OFFICE 2,130,881

WHEEL

Frederick C. Frank, South Bend, Ind., assignor to Bendix Products Corporation, South Bend, Ind., a corporation of Indiana Application April 24, 1935, Serial No. 17,902

6 Claims. (Cl. 301—65)

This invention relates to wheels and more particularly to wheels for aircraft.

In the construction of wheels for use in aircraft it is desirable that the wheels be as light as is possible, consistent with incorporating the desired strength. Such wheels are frequently subjected to severe shock and over-load when the aircraft is landing. This is especially true where forced landings are made, at which time, in order to minimize the rolling distance of the airplane after contacting the ground, it frequently happens that the aircraft contacts the ground at a relatively high descending velocity. The damage resulting to the aircraft and the occupants thereof due to a wheel failure, are so severe that it is necessary to take all possible precautions to minimize such failures. It is therefore necessary that wheels intended for use on aircraft be especially strong to withstand these periodical severe over-loads.

An object of this invention is therefore to provide a very strong, yet light, wheel adapted especially for use with aircraft.

Another object of the invention is to provide a wheel incorporating the desired features of strength and lightness, which may be easily formed by a casting process.

A further object of the invention is to provide a very strong wheel adapted especially for use with road vehicles.

A still further object of the invention is to produce a strong wheel having a corrugated web structure having transversely extending webs between the hub and the rim, disposed at an angle with respect to the axis of the wheel to facilitate the casting of the wheel.

Another object of the invention is to provide a corrugated disc or web wheel having a drop-center rim.

Another object of the invention is to produce a wheel wherein a drop-center rim is employed to provide a maximum space to receive the inner tube of a tire, and a corrugated disc or web wheel structure designed to supply maximum strength per unit weight of the wheel.

A still further object of the invention is to provide a wheel adapted particularly for streamlining the wheel structure to produce the minimum air resistance when moving through the air.

Other objects and advantages of this invention will appear from the following detailed description, taken in connection with the accompanying drawings, submitted for purposes of illustration only, and not intended to define the scope of the invention, reference being had for that purpose to the subjoined claims.

In the drawings, wherein similar reference characters refer to similar parts throughout the several views.

Figure 1:
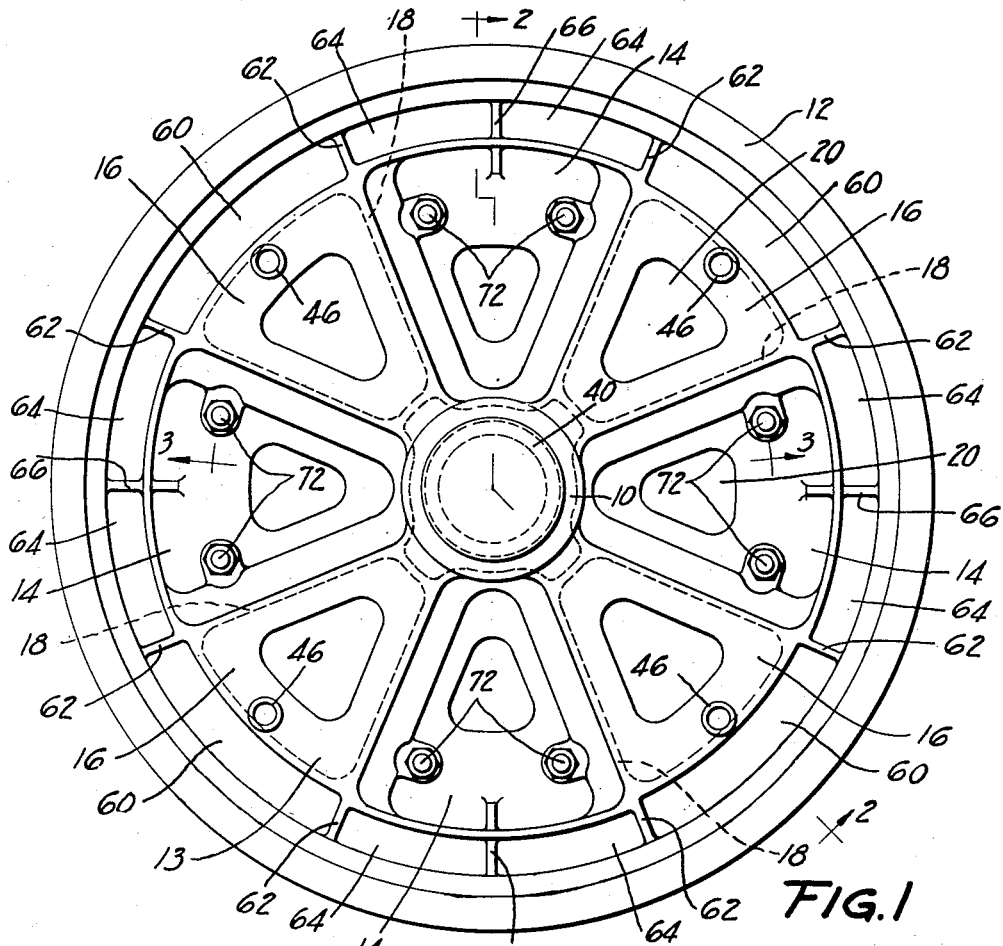
Figure 1 is a view in outboard side elevation of a wheel embodying the features of this invention.
Figure 3:
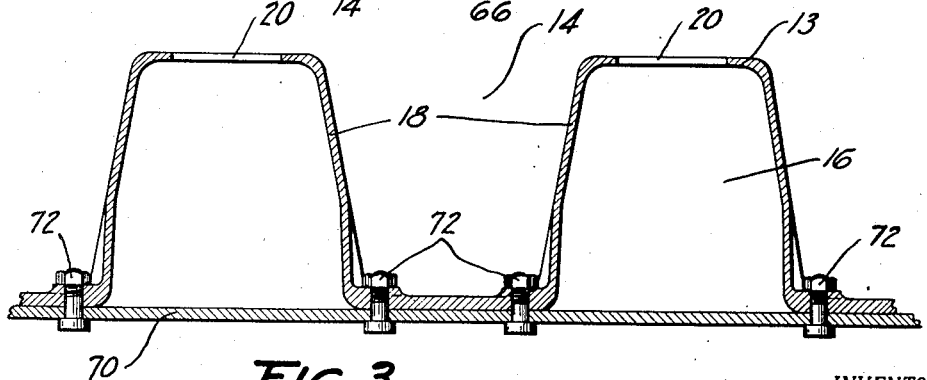
Figure 3 is a view taken on the lines 3—3 of Figure 1.

Referring more particularly to Figure 1, there is shown a wheel structure having a hub section 10 and a drop-center rim 12. The hub and rim of the wheel are joined together by means of a so-called corrugated web structure wherein a thin wall of metal 13, extending axially along the hub at an angle thereto, is projected in a plane to meet with the inner portion of the drop-center rim in a plane at an angle with respect to the axis of the wheel. The thin wall of metal 13 then projects in a plane perpendicular to the axis of the wheel along the inboard side of the wheel to form the arcuate-shaped sections 14. The wall of metal 13 then projects back across to the outboard side of the wheel to form the arcuate-shaped sections 16. The wall of metal 13 weaves back and forth between the inboard and outboard sides of the wheel until the entire circumference of the wheel between the hub and the rim has been covered by these so-called corrugated sections.

This structure lends itself nicely to making the wheel casting mould. The hub core is the only core that it is necessary to use in the formation of the complete wheel. The pattern is so formed that after the metal has solidified, the mould may be separated, leaving the wheel completely formed. A very simple and inexpensive method of forming a wheel is thus provided.

Any desired number of corrugated sections may be employed consistent with the requirements of strength and lightness. This embodiment of the invention shows a structure wherein four arcuate-shaped sections 14 and 16 are formed on the inboard and outboard sides of the wheel respectively. It will be noted that four corrugated sections are formed on each the inboard and outboard sides of the wheel between the hub 10 and the drop-center rim 12. In this embodiment of the invention eight thin walls of metal 18 project between the hub 10 and the drop-center rim 12, at an angle with respect to the axis of the wheel. The arcuate-shaped sections 14 and 16, projecting from the hub to the rim, may be cut away to decrease the weight of the structure, thereby forming apertures 20. It has been found from tests that the removal of the metal in this area will not impair the strength of the wheel.

Figure 2:
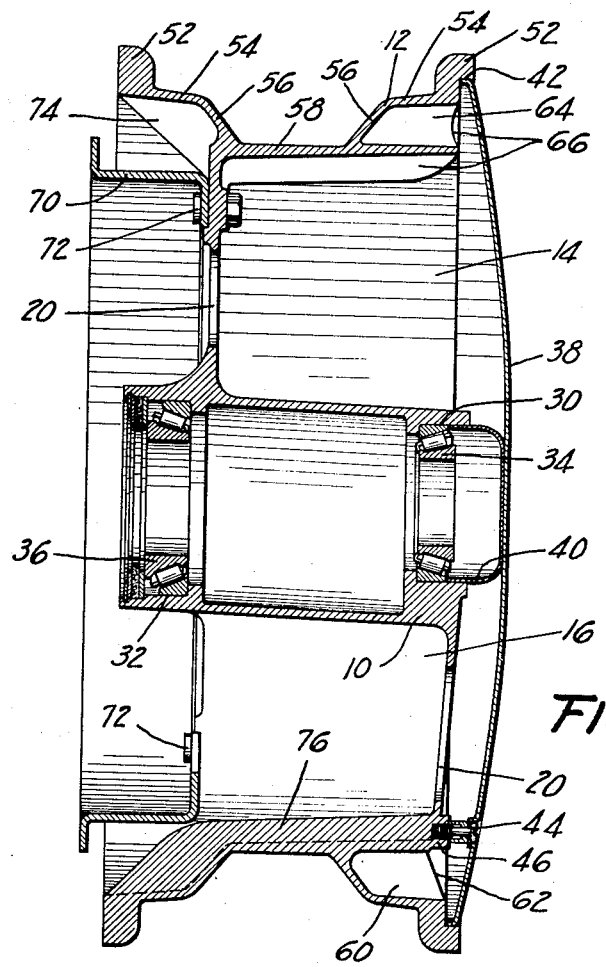
Figure 2 is a sectional view taken on the lines 2—2 of Figure 1.

Figure 2 shows the hub portion 10 of the wheel having bearing faces 30 and 32 respectively, adapted to receive roller bearings 34 and 36 respectively, to fit the wheel to an axle (not shown). A cover plate 38, having a cap 40, is designed to fit into an annular depression 42 formed in the outboard side walls of the drop-center rim 12. The cap 40 is designed to slide into the bearing face 30 to seal the end of the bearing and to prevent the bearing lubricant from escaping. The plate 38 is fixed to the rim section 12, by means of studs 44 threaded into bosses 46 carried by the arcuate-shaped section 16 of the wheel.

The rim 12 is of the drop-center type, having tire engaging flanges 52, flat sections 54, and inwardly sloping sections 56 terminating in a reduced section 58. Greater air capacity is thus provided within the tire, so that greater resiliency is afforded, resulting in better operation of the vehicle to which the wheel is attached.

The outboard side of the wheel is formed with a plurality of indentations 60 overlying the arcuate-shaped section 16 to compensate for the inwardly sloping section 56 of the rim 12. Reinforcing flanges 62 extending from the outer edges of arcuate-shaped sections 16 to the outboard tire engaging flange 52 reinforce this section of the wheel.

The outboard side of the wheel is also provided with indentations 64 overlying the projected upper surface of the arcuate-shaped sections 14. A reinforcing flange 66, extending from the outboard tire engaging flange 52, extends between the indentations 64 and projects axially across the wheel to the inner surface of the arcuate-shaped section 14 on the opposite side of the wheel.

The inboard side of the wheel is provided with a brake drum 70 fixed to the arcuate-shaped section 14 in any convenient manner as by bolts 72. Reinforcing flanges 74 project from the inboard tire engaging flange 52 to the arcuate-shaped section 14 to stiffen the inboard side of the wheel. Reinforcing flanges 76, extending from the inboard tire engaging flange 52, are projected axially across the wheel to the inner surface of the arcuate-shaped section 16 on the opposite side of the wheel.

Figure 4:
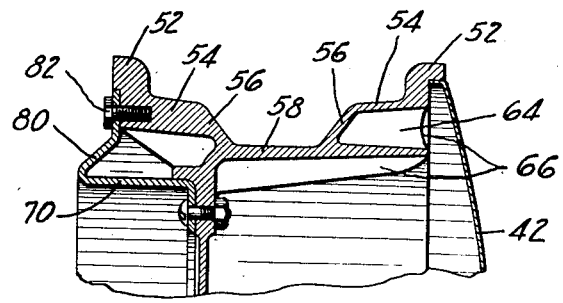
Figure 4 is a detailed sectional view similar to a portion of Figure 2, showing a modified form of the invention.

Figure 4 shows a modification wherein the brake drum 70 is provided with a reinforcing flange 80 bolted to the edge of the inboard side of the rim section 12 by means of bolts 82.

Figure 5:
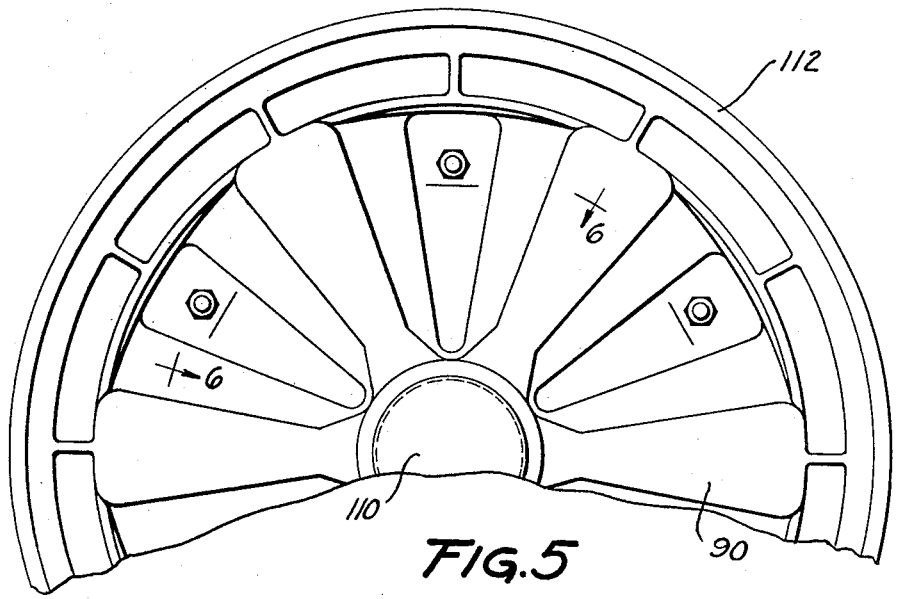
Figure 5 is a view similar to Figure 1, but showing a modified form of the invention.
Figure 6:
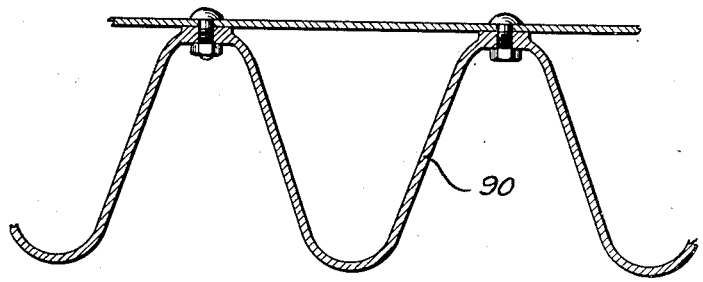
Figure 6 is a sectional view taken on the lines 6—6 of Figure 5.

Figure 5 shows a modified form of the invention wherein a corrugated wall of metal 90 extends between the axle 110 and the rim 112. The corrugated wall 90 weaves back and forth axially about the circumference of the wheel in a manner similar to that of the embodiment shown in Figure 1. Obviously, any desired number of corrugated sections may be employed to meet the requirements of strength, size of the wheel, desired weight, etc.

While the invention has been described with reference to two particular embodiments thereof, it is not intended that the invention shall be restricted to the features shown, nor otherwise, than by the terms of the following claims.

I claim:

1. A cast airplane wheel having inboard and outboard sides, a hub, a drop-center rim, a plurality of triangular shaped flat inboard side walls extending between the hub and rim, a plurality of triangular shaped flat outboard side walls extending in generally parallel relation with the inboard side walls between the hub and rim and staggered with respect to the inboard side walls, and means including a plurality of flat walls of metal diverging from the outer edges of the triangular shaped inboard side walls to the triangular shaped outboard side walls to build up a continuous web about the circumference of the wheel, said rim having tire bead supporting flanges substantially radially in line with said inboard and outboard flat side walls whereby a maximum of direct support to said hub immediately beneath said flanges is provided.

2. An airplane wheel having inboard and outboard sides, a hub, a drop-center rim, a plurality of generally triangular shaped flat inboard side walls extending between the hub and rim, a plurality of generally triangular shaped flat outboard side walls extending between the hub and rim and staggered with respect to the inboard side walls, means including a plurality of flat walls diverging from the inboard side walls to the outboard side walls to build up a continuous web about the circumference of the wheel, and reinforcing flanges associated with the rim and extending axially, said rim having tire bead supporting flanges substantially radially in line with said inboard and outboard flat side walls whereby a maximum of direct support to said hub immediately beneath said flanges is provided across the wheel from the midsections of the inboard and outboard side walls.

3. A cast airplane wheel having a hub, a rim, connecting means between the hub and rim comprising flat staggered generally triangular shaped inboard and outboard walls extending in generally parallel relation between the hub and rim on opposite sides of the wheel, and a plurality of walls extending axially across the hub and rim at an angle with respect to the longitudinal axis of the wheel and interconnecting the opposite extremities of the flat staggered generally parallel inboard and outboard walls on opposite sides of the hub, said rim having tire bead supporting flanges substantially radially in line with said inboard and outboard flat side walls whereby a maximum of direct support to said hub immediately beneath said flanges is provided.

4. A cast airplane wheel having a hub, a rim, connecting means between the hub and rim comprising flat staggered substantially triangular shaped thin walls of metal having apertures therein extending in generally parallel relation between the hub and rim on opposite sides of the wheel and a plurality of flat thin walls of metal extending axially across the hub at an angle with respect to the longitudinal axis of the wheel and interconnecting the opposite extremities of the generally parallel walls on opposite sides of the hub, and reinforcing flanges extending axially across the wheel from the midsection of the substantially triangular walls, said rim having tire bead supporting flanges substantially radially in line with said staggered flat side walls whereby a maximum of direct support to said hub immediately beneath said flanges is provided.

5. A cast integral airplane wheel comprising a hub having spaced bearing supports and a rim having spaced tire bead supporting flanges, a plurality of staggered generally triangular-shaped substantially flat parallel walls extending from the hub to the rim substantially in axial alignment with said flanges, and a plurality of walls extending substantially longitudinally of the hub from points adjacent the spaced bearing supports to points adjacent the spaced tire-engaging flanges and interconnecting the staggered generally triangular-shaped substantially parallel walls extending from the hub to the rim.

6. A cast integral airplane wheel comprising a hub having spaced bearing supports and a rim having spaced tire bead supporting flanges, a plurality of staggered generally triangular-shaped substantially flat parallel walls extending from the hub to the rim substantially in axial alignment with said flanges, a plurality of walls extending substantially longitudinally of the hub interconnecting the staggered generally triangular-shaped walls extending from the hub to the rim, and reinforcing flanges associated with the rim and the generally triangular-shaped walls and projecting axially across the wheel.

FREDERICK C. FRANK.